United States Patent
Zemel et al.

[11] Patent Number: 6,149,856
[45] Date of Patent: Nov. 21, 2000

[54] ULTRAVIOLET-BASED, LARGE-AREA SCANNING SYSTEM FOR PHOTOTHERMAL PROCESSING OF COMPOSITE STRUCTURES

[75] Inventors: Marc I. Zemel, Bedminster, N.J.; Thomas J. Dunn, Mohegan Lake, N.Y.

[73] Assignee: Anvik Corporation, Hawthorne, N.Y.

[21] Appl. No.: 09/191,819

[22] Filed: Nov. 13, 1998

[51] Int. Cl.[7] .............. C08F 2/50; B29C 47/96; B32B 9/04; G03C 5/00
[52] U.S. Cl. ............ 264/401; 425/174; 425/174.4; 428/411.1; 430/269; 430/270.1; 522/1; 522/2
[58] Field of Search .................. 430/269, 270.1; 522/2, 1; 250/492.1, 493.1, 494.1, 495.1, 504 R, 505.1; 428/411.1; 425/174, 174.4; 264/401

[56] References Cited

U.S. PATENT DOCUMENTS

| | | | |
|---|---|---|---|
| 4,924,257 | 5/1990 | Jain | 355/53 |
| 5,002,855 | 3/1991 | Fan et al. | 430/270.1 |
| 5,076,974 | 12/1991 | Modrek et al. | 264/401 |
| 5,573,889 | 11/1996 | Hofmann et al. | 430/285.1 |
| 5,652,645 | 7/1997 | Jain | 355/53 |
| 5,710,619 | 1/1998 | Jain et al. | 355/50 |
| 5,721,606 | 2/1998 | Jain | 355/53 |
| 5,777,342 | 7/1998 | Baer | 250/492.2 |
| 5,828,505 | 10/1998 | Farmiga | 359/857 |

*Primary Examiner*—Susan W. Berman
*Attorney, Agent, or Firm*—Carl C. Kling

[57] ABSTRACT

In making thermoset and photo-set polymer-matrix composite parts, curing is the key process step that transforms the molecular structure of the composite material, stabilizing it in the desired shape. This curing system applies carefully controlled ultraviolet (UV) radiation dosages, appropriately distributed over the entire surface of the composite part, thereby rapidly curing the material while enabling direct monitoring and control of the curing energy. Previous photo-curing methods have applied generalized radiation to a part with conventional UV lamps. We provide great benefits in cure depth, speed and process control by precisely controlling all parameters of UV dosage, by computed control, by markings on the part, or by dynamic feedback control from embedded sensors or non-contact sensors. This system can apply greater radiation dose to areas of increased quantities of resin, such as support ribs, and lesser radiation dose to areas of decreased quantities of resin. This method can be enhanced by using differing resins which respond to differing wavelengths, and also by controlled changes of radiation field size or duration. This curing system also enables temporary joining of parts by sufficient partial or controlled-area photo-setting, which may also be integrated with lay-up or winding operations. As a result, these partially cured parts can be handled safely through later stages of the manufacturing process, such as final photo-setting or baking operation in an oven or autoclave.

33 Claims, 5 Drawing Sheets

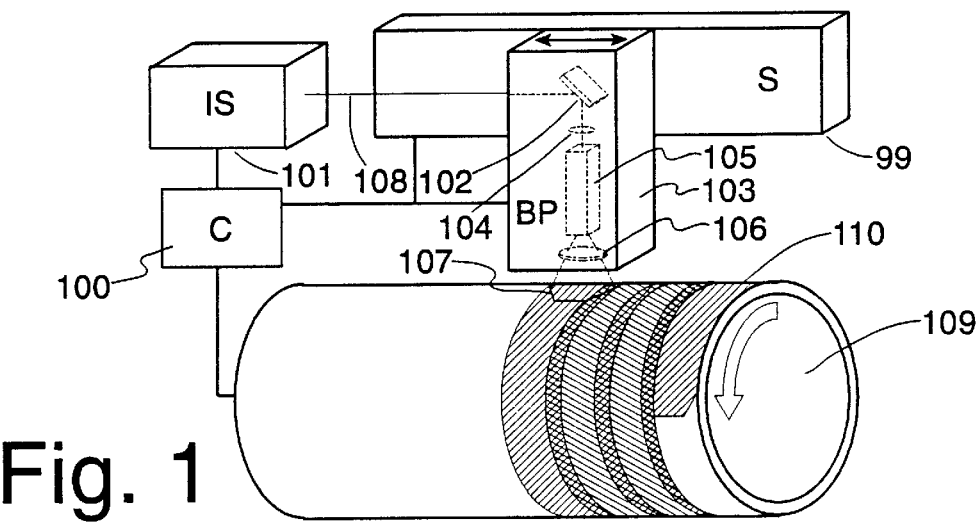
Fig. 1
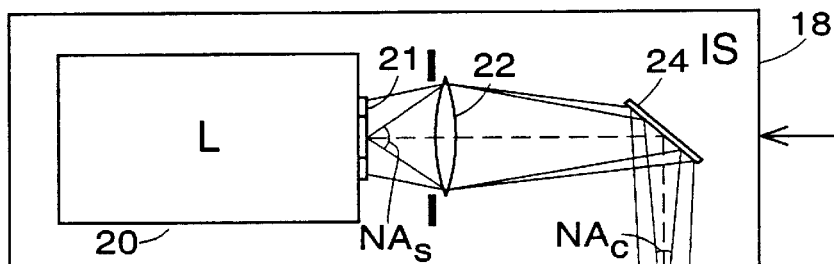
Fig. 2 PRIOR ART
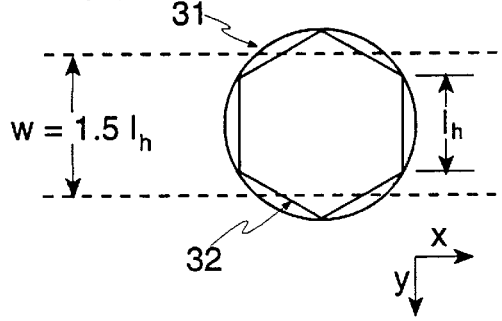
Fig. 3 PRIOR ART
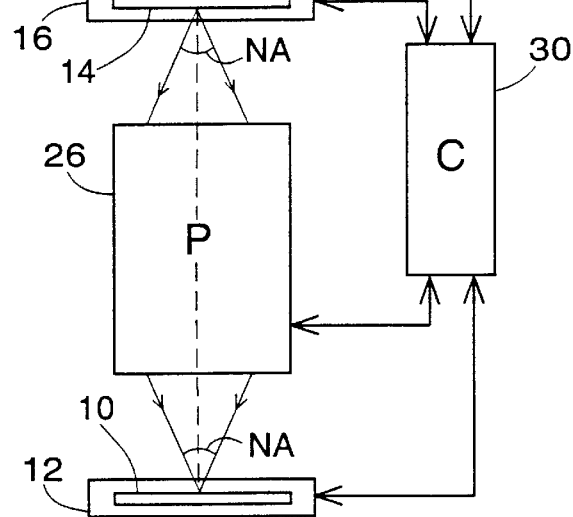

ULTRAVIOLET-BASED, LARGE-AREA SCANNING SYSTEM FOR PHOTOTHERMAL PROCESSING OF COMPOSITE STRUCTURES

CROSS-REFERENCE TO RELATED APPLICATIONS

None

STATEMENT REGARDING FEDERALLY SPONSORED RESEARCH OR DEVELOPMENT

None

REFERENCE TO A "MICROFICHE APPENDIX"

None

BACKGROUND OF THE INVENTION

1. Field of the Invention

This invention relates to a technique for curing of photo-set resins in resin/fiber matrix composites, and particularly relates to a technique for extremely rapid, precisely controlled deep curing of resin/fiber composite parts, both during and after lay-up, using an excimer laser in seamless overlapping scans as a source of ultraviolet curing radiation.

2. Description of Related Art

In the manufacturing of thermoset and photo-set polymer-matrix composite parts, curing is the key process step that transforms the molecular structure of the composite material, stabilizing it in the desired shape. The polymer-matrix composite materials, known as resin matrix composites, include a base polymeric material that encapsulates reinforcing fibers. These composite structures are generally classified as thermoplastic resin or thermoset resin. Thermoset resin is preferred for many composite parts since they are "set" irreversibly (that is, the long-chain molecules of the polymer become cross-linked in a permanent three-dimensional arrangement) whether by heat, room-temperature chemical bonding or by ultraviolet or other photo-setting radiation. Unlike a thermoplastic resin part that can be melted down and re-shaped, the thermoset part configuration is not reversible; the resulting composite part, once cured, is very durable even when subjected to heat and chemical stress.

The reinforcing fiber may consist of glass, carbon, boron, aramid materials or other fiber, whose function is to add strength and stiffness. Many of these fiber materials are selected because of their light weight and high stiffness. These properties are especially desirable for parts in such structures as aircraft wings, automotive body panels, and high-end sporting goods. The products can range in size, from a few square inches in area for some molded parts, to tens or even hundreds of square feet for aerospace structures. The products also have a range of thickness, and are capable of achieving highly complex geometric forms including tapers and integral reinforcing structures.

An important element in the manufacturing of composite structures is a curing system that can handle large and complex parts with a high processing throughput. The curing process determines not only the ultimate performance of the product (by setting the strength of the adhesion between the fiber and the matrix and determining the final shape of the product after shrinkage) but also the economics of the entire manufacturing process through such key factors as materials cost, process cost, throughput, and yield. Throughput is usually measured as the number of units of production per day, and yield is usually measured as a percentage of the number of acceptable units per hundred units manufactured.

In many of these applications, the curing process can take several hours to complete. Furthermore, thermal stresses may arise in the composite parts during the curing operation, due to the different expansion characteristics of the composite materials and the tooling, and due to configuration complexities of the composite structures themselves. These thermal stresses may cause the part to shrink unevenly, warp, and/or retain unwanted residual stresses. Additionally, the curing process in thermoset resins initiates an exothermic reaction in the composite part, which complicates the process control. In an attempt to control the properties of the cured part and minimize the cure time, manufacturers have developed empirical 'recipes,' process models, and sensor-based control systems. These methods are somewhat successful, but they are also expensive due to the trial and error process and the highly customized tooling that is required. When fabricating large structures, it is difficult to control directly the amount and rate of heat applied to the resin. It is therefore desirable to develop a large-volume, high-throughput curing system that can provide manufacturers with direct control of the curing process.

Designers of UV-based curing systems in the prior art have generally not considered how to deliver the ultraviolet radiation to initiate the curing process. The most precise controls of ultraviolet radiation have been developed for microelectronics manufacturing in which precise patterns are imaged onto photoresists for patterning microelectronics products such as integrated circuits and circuit boards. This patent presents a novel, UV-based, large-area scanning system for photothermal processing of composite structures. It is based on a scan-and-repeat exposure technology that allows seamless curing of large composite structures by delivering UV radiation in a concentrated controlled beam.

RELATED ART

Current Curing Technologies

In this section, we present a brief review of the major curing technologies used currently in the manufacturing of composite structures. The existing approaches do not currently address all of the military and industry's needs. For example, in the applications that require thermo-setting resins, the parameters for the cure cycle need to be carefully controlled in order to induce specific chemical reactions within the polymer matrix. In this proposal, it will become clear that significant improvements can be realized through the construction of a UV-based cure system that can seamlessly cure large parts.

The existing curing systems can be classified into three general categories: (a) ovens and pressurized heating systems, (b) heated tool systems, and (c) integrated shape formation and curing systems. Each of these categories is described briefly below.

Ovens and Autoclaves

An autoclave is an oven that applies both heat and pressure for curing of composite structures. Pressure is often required for the curing process in order to consolidate the laminate, ensure proper bonding with the fibers, and to create high fiber-to-matrix volume ratios. Autoclaves typically apply 85 psi of pressure and heat up to 350° F. for curing composite materials but often exceed these values. Heat transfer to the structure being cured is achieved by the convection of pressurized gas within the autoclave. Typical structure sizes range from 2 inches to 50 feet in diameter and from 12 inches to 200 feet in length [2].

In some composite structures, the resins cure at room temperature, and only pressure is applied. Other techniques of applying pressure to the structure include placing the part inside of a flexible, plastic bag under vacuum or wrapping the part with 'shrink tape.' In filament winding applications, the part is prepared by wrapping the resin-fiber combination ('prepreg') around a core, and the resulting tension from the winding process applies the required pressure as the part is cured in a conventional oven.

In oven and autoclave systems, a uniform temperature and pressure is applied externally to the entire structure being cured. When uniform temperature and pressure is applied externally to parts of varying thickness, the result is a non-uniform gradient making it difficult to control the depth of cure. This non-uniform temperature variation also makes it extremely difficult to control the viscosity of the resin. The net result is that the design of the part is constrained whenever use of oven-based systems is considered. Other frequent problems of autoclaves and ovens include improper rates of heating, blown vacuum bags, and loss of pressure.

When ovens are used for curing large composite structures, the thermal mass that needs to be heated is so large that a long period of time is required to raise the temperature of the structure to the desired level. After the part is cured, the entire oven often needs to be reduced to room temperature before the next part can be processed. The slow rate at which the temperature rises and falls results in a significant impediment to the manufacturing throughput.

Heated Tool Systems

With integrally heated tooling, the heat required to cure the polymer matrix is provided through the tool itself. In these systems, heat is typically provided by imbedded resistive heaters or heated fluid channels within the tool. These systems are often combined with either vacuum bagging or matching molds to apply pressure to the part as it is heated. When matching molds are used to apply pressure, it is necessary to cover the part with a coating in order to facilitate removal of the part after cure. The tooling is often manufactured from steel, and wide ranges of sizes and shapes are possible.

Heated tool systems, by necessity, are comprised of materials that differ from the composites that are being cured. As a result, differential rates of thermal expansion between the part and the tool can lead to stress buildup in the part. Upon removal from the tool, the part may relax (or warp) into a lesser-stressed state. It is very difficult to predict warpage and ensure that the desired shape is maintained. This problem is exacerbated for composite materials, which often have anisotropic rates of thermal expansion.

Additional problems arise since the heat is generated from a finite number of fluid channels or electrical resistance heaters. This results in local hot or cold spots that severely limits the tool's ability to cure parts uniformly.

Integrated Shape Formation and Curing Systems

There are a variety of techniques that combine the processes for shaping and curing of composite structures. Most of these processes involve a one-sided or two-sided mold. The resin and fiber are inserted into the mold by a variety of means (injection, hand lay-up, spray-up, etc.) and then cured by either of the methods described in the two previous sections.

There are other integrated curing and shaping techniques that are also employed. In a process known as pultrusion, fibers are pulled through a resin impregnation bath and then through a long steel die which is heated. Radio frequency-induced heating has been successfully applied to speed up the rate of pulling [4]. Another technique employed by some companies uses electrical resistance heaters during automated tape lay-up in order to accelerate the curing process [5].

The significant drawback to use of integrated curing and shaping techniques is the high level of customization that is required to manufacture each type of structure. Each mold or die is unique to a particular type of composite structure making it difficult to build and test prototypes especially for large structures. This technology is also limited in the types of shapes that can be manufactured.

Limitations of Current Curing Techniques

The ideal system for curing polymer matrix composite materials should combine three key attributes: it should have the ability to handle large sizes, it should operate with high processing throughput, and it should provide direct control of the curing process. In light of these and other desirable performance features, these prior technologies fall short, as follows:

(i) Autoclave and oven curing systems cannot uniformly cure parts of varying thickness resulting in a constraint on the types of designs that can be cured with this technology.

(ii) Autoclaves and oven curing systems also have problems with improper rates of heating, blown vacuum bags, and loss of pressure.

(iii) In the use of heated tool systems, differential rates of thermal expansion between the part and the tool can lead to stress buildup in the structure. The resulting warpage of the material is exacerbated by the anisotropic rate of thermal expansion for composite structures making it difficult to control the final shape.

(iv) Heated tool systems are not able to cure parts very uniformly since the heat source consists of a finite number of imbedded heat sources.

(v) For large parts, all curing processes that involve heating develop large thermal inertias either in a steel tool or in a large volume of air. The throughput is severely limited by the time required to heat and cool the structures.

(vi) As the size of the part increases, the size of the oven or tool required to cure the part increases, leading to higher costs.

(vii) When molds are used, either for heated tool systems or integrated curing systems, a change in part size or shape necessitates the construction of a new mold. These changes can be especially costly during prototyping.

(viii) Other processes, such as pultrusion, are severely limited in the types of shapes that they can cure.

(ix) It is difficult to handle the parts during transfer from lay-up to oven-cure without causing damage; that is, the part is too unstable to be moved safely, because the uncured resin lubricates the fibers, which may move, while the resin flows or drips from the part, causing both flaws and mess.

From the above list, it is clear that all existing technologies for curing of composite parts suffer from major limitations. Ideally, whereas one desires the relative flexibility of ovens in processing different shapes, one would also like the processing speed of pultrusion without any of the other disadvantages described above. The curing technology described in this patent satisfies these objectives.

PHOTO-INITIATORS

There are certain chemical additives that are sensitive to ultraviolet radiation and serve as photo-initiators. One material that includes these photo-initiator additives is "Accuset 303." The photo-initiators serve to start exothermic curing reactions that are initiated during illumination and may continue after the illumination has stopped. Photo-initiators are commonly mixed throughout the thermoset resin and can be subject to a two-step process: after the part has been configured it is stabilized by being partially cured; after stabilization, the part can be held in process inventory for a reasonable period of time, if desired, and can subsequently be fully thermoset by heat-curing in an oven [1,9,10]. Alternatively, the resin may be fully cured through continued exposure to ultraviolet light.

Prior-Art, Large-Area, High-Throughput Patterning Technology

The newly developed curing system utilizes a seamless scanning technology using overlapping small-field scans to cure large structures. In the next section we will outline how the scanning technology works for manufacturing of microelectronic products in a lithography application.

U.S. Pat. No. 4,924,257, issued May 8, 1990, and U.S. Pat. No. 5,285,236, issued Feb. 8, 1994, show a seamless scanning technology that allows high-resolution imaging of very large substrates without the difficulties associated with other lithography techniques. It is simplest to describe the patterning technology when implemented in a projection system for use with a conventional mask, so this section will describe the seamless scanning technique when applied to projection printing. The UV-based curing system described in the next section uses the same scanning technique with only some of the hardware described in this section. The technology to be described in this section has already been experimentally demonstrated [7] and several prototype systems have been constructed for use in patterning flat-panel displays, multichip modules, and printed wiring boards.

FIG. 1, which describes the present invention, will be discussed infra. FIGS. 2–5 (prior-art) schematically illustrate the state-of-the-art in scan-and-repeat patterning systems used with a mask in a seamless, overlapping scan projection lithography application according to the previous patents identified as prior art. FIG. 2 shows a representative system. FIGS. 3 and 4 (prior-art) are useful in understanding the overlapping complementary hexagonal scans to be carried out by an apparatus such as that of FIG. 2. The substrate 10 and the mask 14 are shown in FIG. 2 rigidly held in a substrate stage 12 and a mask stage 16, respectively. Both the substrate stage and the mask stage move in synchronism, with fine precision. The illumination subsystem 18 consists of a source system 20, a relay lens 22, and beam steering optics 24. The source system is such that its effective emission plane 21 is in the shape of a regular hexagon. The relay lens 22 collects radiation into a certain numerical aperture, NA, from the effective emission plane 21, and directs it with a certain magnification and numerical aperture, $NA_c$, on the mask 14. A projection lens assembly 26, which may consist of several individual lens elements and prisms or mirrors, forms a precise image of the high-resolution pattern, contained within the illuminated hexagonal region on the mask, onto the substrate 10. The projection lens has a numerical aperture NA determined by the resolution requirements of the patterning system and is designed for as large a circular image field as possible (shown by 31 in FIG. 3). The exposure region on the substrate 10 is then defined as the largest regular hexagon (32 in FIG. 3) that can be inscribed within the above circular image field 31.

Returning to FIG. 2, the substrate stage scans across the substrate 10 so that the hexagonal exposure region traverses the length of the substrate 10 in the direction of the scan. Simultaneously, the mask stage 16 scans the mask 14 so that the hexagonal illuminated region traverses the length of the mask 14 in the direction of the scan. After completion of a scan, both stages move in a direction orthogonal to the scan direction by an amount termed the "effective scan width." Following such a lateral movement, a new scan is generated by precise movements of the substrate and mask stages in the same manner as before. The effective scan width and the illumination source system are designed with such characteristics that in combination, they produce a transition, from one scan to the next, that is totally 'seamless' and free from any intensity nonuniformity. The above exposure process, thus termed a 'scan-and-repeat' mechanism, is repeated until the entire substrate is exposed.

FIG. 4 illustrates the details of the mechanism of prior-art seamless hexagonal scanning. The regular hexagon 36, also shown as a-b-g-j-h-c, represents the illuminated region on the substrate at any given instant in time. The substrate is scanned across this illumination region from the right to the left. This is shown as scan 1, or 50, in FIG. 4. The orientation of the hexagon 36 is such that one of its sides, for example b-g, is orthogonal to the direction of the scan. To generate the next scan, first the substrate is moved, in a direction orthogonal to the scan direction, by a distance w (52), determined by $$w = 1.5 l_h,$$

where $l_h$ is the length of each side of the hexagon. (As discussed below, w is the effective scan width.) This new position of the illumination region, relative to the substrate, is 38, also shown as d-e-n-m-k-f. Now scan 2 (54), is generated by scanning the substrate, in the reverse direction, across the hexagonal illumination region 38. At the end of scan 2, the substrate is again moved by a distance w (56), the scan direction is again reversed, and scan 3 (58) is generated, and so on.

An important aspect of the above scan-and-repeat mechanism, namely the seamless overlap region between adjacent scans, may be understood as follows. First let us identify the non-overlapping regions. In scan 1, the region swept by the rectangular portion b-g-h-c of hexagon 36 is not overlapped by any portion of scan 2. Similarly, in scan 2, the region swept by the rectangular portion e-f-k-n of hexagon 38 is not overlapped by any portion of scan 1. However, the region swept by the triangular segment a-b-c of hexagon 36 in scan 1 is re-swept in scan 2 by the triangular segment d-e-f of hexagon 38. By integrating the dose received from each of the above triangular segments at any point on the substrate in the overlapping region, it can be shown that the cumulative exposure dose received anywhere in the overlapping region is the same as in the non-overlapping regions. Furthermore, the transition from scan 1 to scan 2 (and therefore the entire substrate) is seamless in exposure dose uniformity because the doses provided by hexagons 36 and 38 not only taper in opposite directions in the overlapping region, they taper to zero at apex a and apex d, respectively.

FIG. 5 shows how, in a prior art system, a laser beam, forwarded by relay lens 61, is treated by multiple reflections inside an internally-mirrored homogenizer 62. This converts the laser beam to a self-luminous light beam, with the same numerical aperture, for projection via projection lens 63.

In aggregate, this scan-and-repeat patterning system technology makes it possible to obtain seamless uniform exposure at high resolution over the entire area of a large substrate. This same scanning technology is utilized in a UV-based large area scanning system for photothermal processing of composite structures.

REFERENCES

1. MIL-HDBK-17-3E, Chapter 2, DOD Coordination Working Draft, pages 2-38–2-51 and 9-8–9-10, especially page 2-44, 1997.
2. Taricco Corporation is an example of a manufacturer of autoclaves.
3. Kalpakjian, Serope, Manufacturing Engineering and Technology, Addison-Wesley Publishing Co., Reading, Mass., 1992.
4. Strong, Brent A., Fundamentals of Composite Manufacturing, Society of Manufacturing Engineers, Dearborn, Mich., 1989.
5. An example of a company that manufactures automated tape lay-up machines is Cincinnati Milacron.
6. Jain, K., Proc. SPIE Symp. on Optical/Laser Microlithography IV, Vol.1463, p. 666, 1991; U.S. Pat. No. 4,924,257, issued May 8, 1990; and U.S. Pat. No. 5,285,236, issued Feb. 8, 1994.
7. Jain, K, et al., Proceedings 1995 International Conference on Multichip Modules, pp. 321-325, April 19-21, Denver, Colo., 1995.
8. Decker, C., Proc. SPIE Symp. Laser Assisted Processing II, vol. 1279, pp. 50-59, 1990.
9. "COMPOSITE BASICS" [online article]; available from http://www.cmicomposites.com/prodlst.htm; Internet.
10. "Resin steps up to bat, improves manufacturing process," Design News, page 41, Jan. 19, 1998.

SUMMARY OF THE INVENTION

This patent application describes a curing system that applies carefully controlled ultraviolet (UV) radiation dosages which are appropriately distributed over the entire surface of the composite part, thereby rapidly curing the material and enabling manufacturers to directly monitor the energy applied to cure the resin matrix.

This seamless scanning technology developed by Anvik Corporation and currently used in lithographic manufacturing equipment for microelectronics, has certain aspects which may also be applied for manufacturing of parts from resin matrix composites. Most of the previously designed systems require accurate control of exposure dose uniformity, but as applied to remarkably flat, thin and smooth substrate surface films which are presented at a fixed focus distance. The films are typically photoresist films, which have well-known and repeatable physical characteristics, are essentially two-dimensional, and are not subject to any exothermic reactions during or following illumination. Illumination for initiating the UV-curing process, on the other hand, must be controllable to provide a uniform dose over the entire surface of a simple-geometry part, or, alternatively, must be controllable to provide different levels of exposure that are geometry-specific for different portions of a complex-geometry part.

This invention is a breakthrough system technology that exploits the design and cost benefits of large-area, scan-and-repeat projection exposure, and, at the same time, enables the user to control very precisely the exposure dosage and, therefore, the curing rate of polymer resin matrix composite materials, for optimum part production. This system can provide high-throughput curing and very accurate control of the curing process, and can greatly increase the ease, neatness, and speed of manufacture while increasing the precision of the finished, cured part.

It is the object of the invention to provide a novel combination of apparatus and technique for carrying out complex curing operations on photo-settable resins having an ultraviolet photo-initiator, using an excimer UV laser or mercury arc lamp with seamless overlapping hexagonal scans and controls over a range of exposure conditions.

Another object is to allow forming temporary attachments among photo-settable parts of all sizes, for providing stabilization/partial curing during the shape formation, for UV-curing of variable or constant thicknesses of photo-settable resins in the same resin/fiber matrix composite part or joined set of composite parts, and for completing the cure by convection oven techniques.

Still another object of the invention is to provide precise control of the curing operation on large composite parts having varying mass of photo-set resin at varying positions.

A feature of the invention is the application of ultraviolet radiation in seamless, overlapping polygonal scans under precise control, to carry out balanced curing of photo-set resins throughout the body of the composite part.

Another feature of the invention is the advantage of complex curing capability as a result of using plural photo-initiators which are susceptible to differing wavelengths, thus allowing for selecting the time and place of attachment during a complex configuration process.

An advantage of the invention is that the curing can be carried out without the problems associated with the preparation of a wet part and its placement, while wet and unstabilized, in a convection oven for curing.

Another advantage of the invention is that, during automated tape lay-up, filament winding or other shape creating operations, concentrated UV radiation may be applied immediately following the winding for a dynamic cure to stabilize the composite part as the current layer is built up, prior to the placement of the next winding over the previously stabilized layer.

Another advantage of the invention is that the curing operation can be carried out in a combination convection oven and UV treatment station, taking full advantage of both heat-curing and UV-initiated curing.

Other objects, features and advantages of the invention will be apparent from the following written description, claims, abstract and the annexed drawings.

BRIEF DESCRIPTION OF THE DRAWINGS

FIG. 1 is a generalized schematic of a cure-initiating system, shown for use with a rotationally symmetric composite part, using a helical hexagonal scan with complementary overlaps.

FIG. 2 (Prior Art) is a diagram of a previously patented laser patterning tool now in the prior art, but useful in understanding small-field Lw illumination.

FIG. 3 (Prior Art) explains a polygon, shown as a hexagon, in the context of scan overlap for seamless exposure.

DETAILED DESCRIPTION OF THE PREFERRED EMBODIMENT

Figure 4:
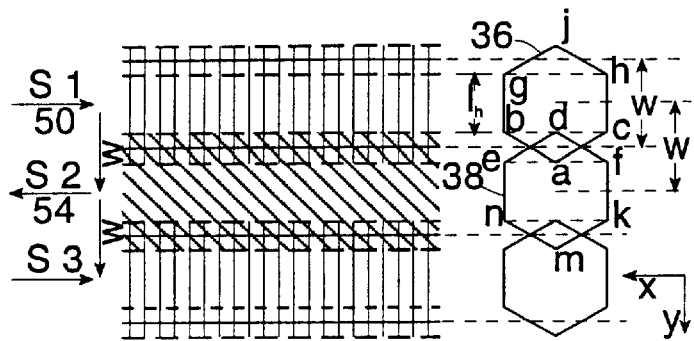
FIG. 4 (Prior Art) explains the seamless overlapping complementary polygonal scanning technique of previous patents.

FIG. 1 shows the preferred embodiment apparatus for a ultra-violet (UV)-based, complementary overlapping hexagonal scan system for curing of resin matrix composite structures. Relative position of optics and composite part are developed by stage (S) 99, shown generalized; control module (C) 100 defines a scan of the composite part. The output of an excimer laser illumination subsystem (IS) 101 is directed into a turning mirror 102 in a scanning beam processing module 103. The scanning beam processing module 103 consists of the turning mirror 102, focusing optics 104, a beam homogenizer 105, and a condenser subsystem 106. The scanning beam processing module 103 is mounted to a large-travel translation stage 99 that is capable of moving the scanning beam processing module 103 over the entire length of the composite part 110 which is to be cured.

Inside the scanning beam processing module 103, the turning mirror 102 directs the laser beam 108 from the excimer laser in illumination subsystem 101 down towards the composite part 110 to be cured. The laser beam 108 passes through focusing optics 104 before entering beam homogenizer 105. The beam homogenizer 105 preferably is a reflective-type system based on Anvik's patented design, comprising a hexagonal light tunnel constructed from high-reflectivity dielectric mirror strips according to U.S. Pat. No. 5,828,505, OPTICAL BEAM-SHAPER-UNIFORMIZER CONSTRUCTION, serial number 08/644,773, filed May 10, 1996, Farmiga, issued Oct. 27, 1998.

Figure 5:
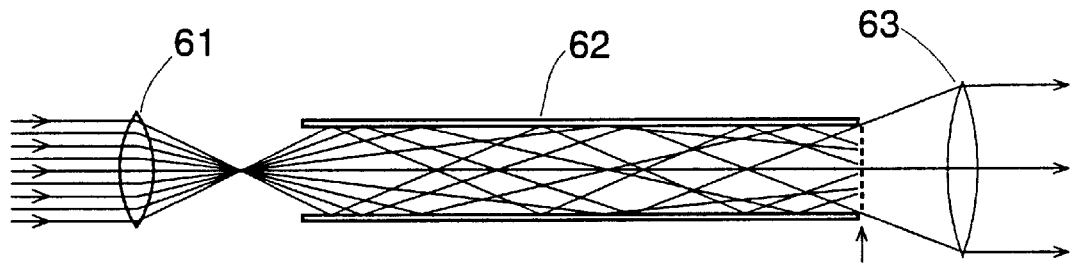
FIG. 5 (Prior Art) is a diagram of an internally-mirrored homogenizer useful in converting laser radiation to self-luminous radiation for use in seamless overlapping complementary polygonal scanning of a composite part.

In FIG. 1, similarly to FIG. 5, the beam homogenizer 105 serves to uniformize the laser beam 108 while preserving the numerical aperture determined by the focusing optics 104. The design maximizes the number of internal reflections while minimizing the overall system length, converting the output of illumination subsystem 101 to a uniform, extended light source. Furthermore, since it is an entirely reflective system, it maximizes optical efficiency by reducing optical losses.

Figure 6:
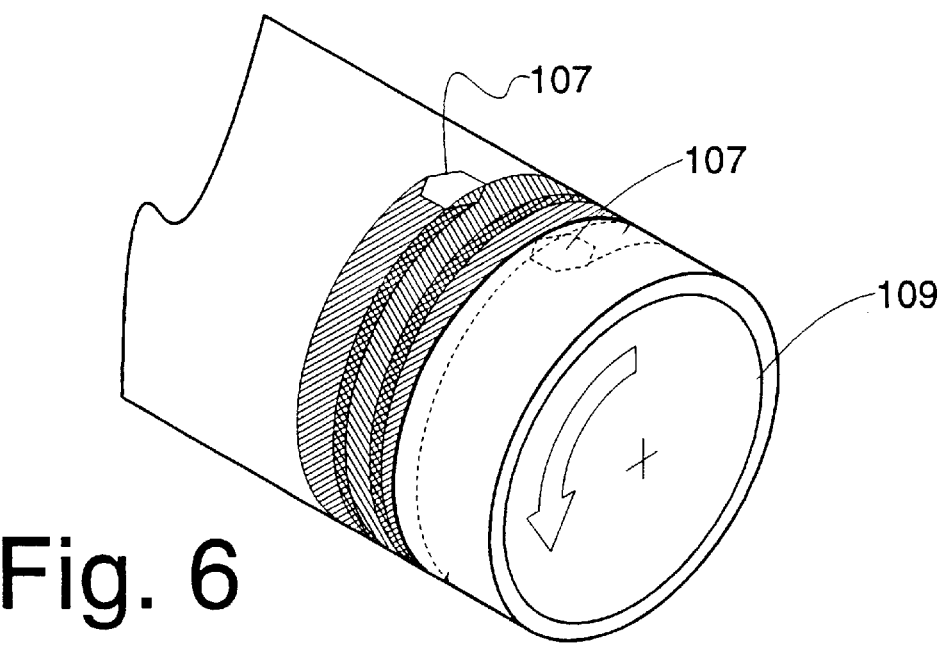
FIG. 6 is a schematic of a cure-initiating system for use with a rotationally symmetric object subjected to a single helical scan.

The condenser subsystem 106 projects the output of the beam homogenizer 105 onto the surface of composite part 110. The condenser subsystem 106 is designed using off-the-shelf optical components to minimize cost and delivery delays. With the exception of the beam homogenizer 105, all of the optics in the beam processing module 103 can be fabricated from off-the-shelf components. Beneath the optical beam processing module 103 the composite part 110 is wrapped around a pre-form, such as mandrel 109. A drive motor (not shown) rotates the mandrel 109 along its axis in only one direction. The optical beam processing module 103 scans continuously at a velocity which is chosen such that, for every complete rotation of the mandrel 109, the optical beam processing module 103 moves the hexagonal beam field by the effective scan width to illuminate polygonal illumination region 107 so as to overlap previously illuminated regions. FIG. 6 shows apparatus for scanning the beam processing module in a manner which allows the entire structure to be exposed by a single, continuous, helical scan. The resulting 'helix' from several rotations of the structure achieves the seamless scan. The velocity of the beam processing module 103, $v_r$, depends on the scanning velocity, $v_s$, as given by the expression:

$$V_r = 1.5 l_h v_s / R$$

where $l_h$ is the length of the side of the illuminating hexagon, and R is the linear distance to complete one rotation of the mandrel.

Exposing the rotational composite part 110, on mandrel 109, in a continuous helical scan offers several speed and convenience advantages over the boustrophedonic (serpentine) scanning pattern. For example, at the end of each serpentine scan, the beam processing module 103 must decelerate to a halt, then reverse direction, and accelerate back to the necessary scanning velocity before the composite structure can enter the object field of the condenser subsystem 106. The acceleration and deceleration occur while the optical beam processing module 103 steps in the orthogonal direction so that the two adjacent scans are separated by the effective scan width. In comparison, when the mandrel 109 is rotated as shown in FIG. 1, the throughput can be effectively increased in two ways:

(1) there is no longer any overhead associated with reversing the scanning direction; and (2) the scanning velocity of the mandrel 109 can be significantly greater than what can be accomplished with linear stages.

Figure 7:
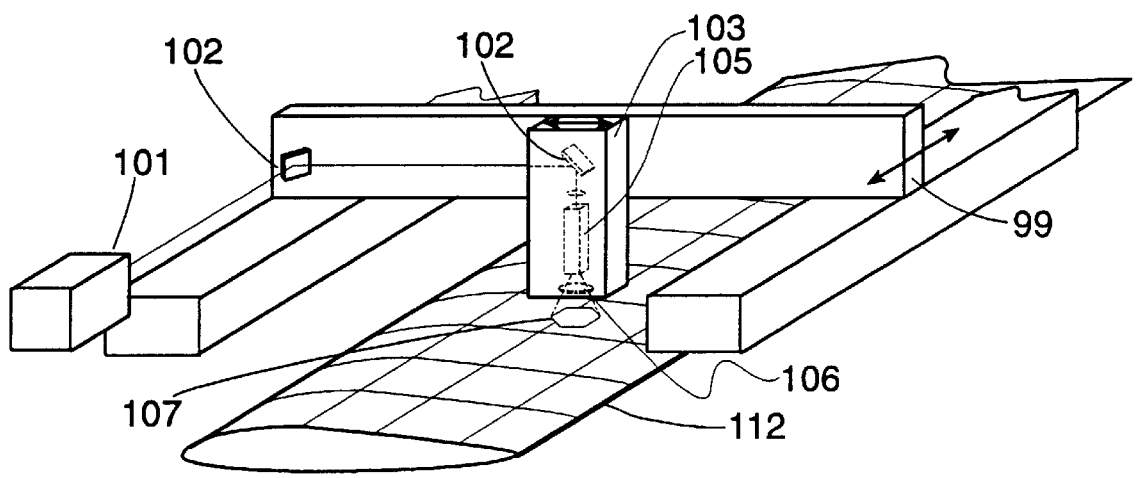
FIG. 7 is a diagram of a cure-initiating system for use with an asymmetric composite part, using a scan by moving the optics with respect to the composite part.

The system shown in FIG. 1 is optimized for those structures that are rotationally symmetric. FIG. 7 shows another embodiment, for UV-curing of large structures or complex parts which cannot conveniently be placed on a round mandrel. Examples are aircraft wings, spacecraft structures, distribution manifolds, etc. The output of the illumination subsystem 101 is directed to an additional turning mirror 102 which is mounted on the translation stage 99 which moves the beam processing module 103 for scanning the airfoil which is complex-geometry composite part 112. The translation stage 99, not shown in detail, since X, Y, Z stage means are known, holds the beam processing module 103 and the turning mirror 102 so that the stage steps the entire assembly to scan the complex-geometry composite part 112. The beam processing module 103 scans the hexagonal beam illumination region 107 across the complex-geometry composite part 112, here shown as an airfoil. After the completion of a scan, the stage 99 steps the entire assembly by the effective scan width so that the next scan can be seamlessly joined with the images resulting from the previous scan. This serpentine, seamless scan can be employed to cover the entire complex-geometry composite part 112, whatever its shape may be.

This scanning technology can also deliver a higher dose to selected areas of the structure. There may be thickness variations in the complex-geometry composite part 112 that require higher doses in certain regions. There may also be support structures, such as ribs, which require higher doses in order to prevent induced stresses leading to warpage. There are several techniques that can be employed to vary the dose over the composite material.

Figures 8, 9:
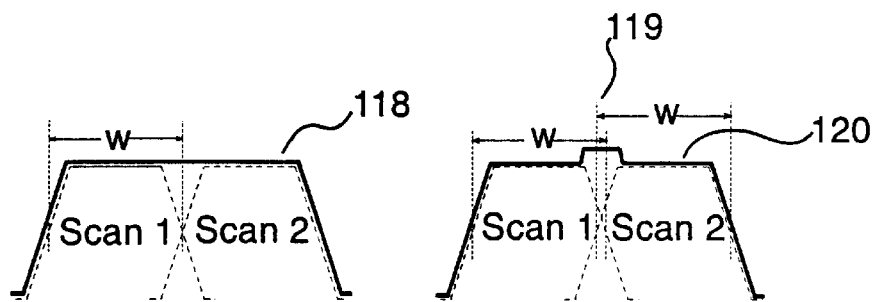
FIGS. 8–10 are diagrams of dosage overlaps, at seamlessness or approaching seamlessness, under a variety of conditions.

FIG. 8 shows the uniform intensity that results from the seamless joining of two scans that are separated by the effective scan width w, as shown by intensity profile 118.

FIG. 9 shows how it is possible to generate an overlap region 119, smaller than the scan width, which has a higher dose than in the non-overlap regions 120. This is accomplished by deliberating choosing a step size that is smaller than the effective scan width w. Similarly, it is possible to deliver regions of smaller dose by choosing a step size that is larger than the effective scan width w.

Figure 10:
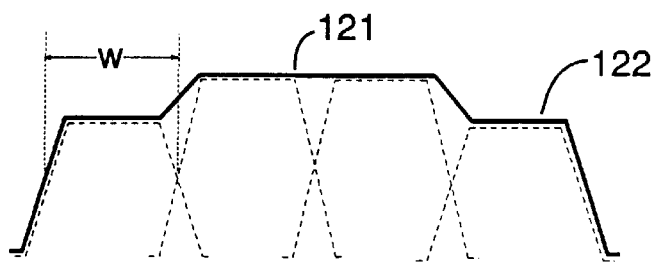

FIG. 10 shows how it is possible to deliver higher doses 121 or lower doses 122 over swaths which are larger than the effective scan width w. Representative ways to change the dose delivered by a single scan to achieve the effect shown in FIG. 10, are as follows:

1. Decreasing the scanning velocity of the beam processing module;
2. Increasing the repetition rate of the laser; and
3. Increasing the pulse energy.

All the above techniques achieve the same result of increasing the dose delivered during a scan.

The techniques illustrated in FIGS. 8–10 all show how one can vary the dose transverse to the scan direction. It is also possible to vary the dose along the scan direction by employing similar methods, i.e., changing pulse energy, scanning speed, or repetition rate. Additionally, one may modify the fluence (energy/area) of the laser beam by changing the field size with a zooming condenser lens system. The result is a seamless exposure to photo-setting radiation, or, where desired, an exposure to photo-setting radiation which is non-uniform where additional mass or other factors suggest such an exposure to photo-setting radiation.

Figure 11:
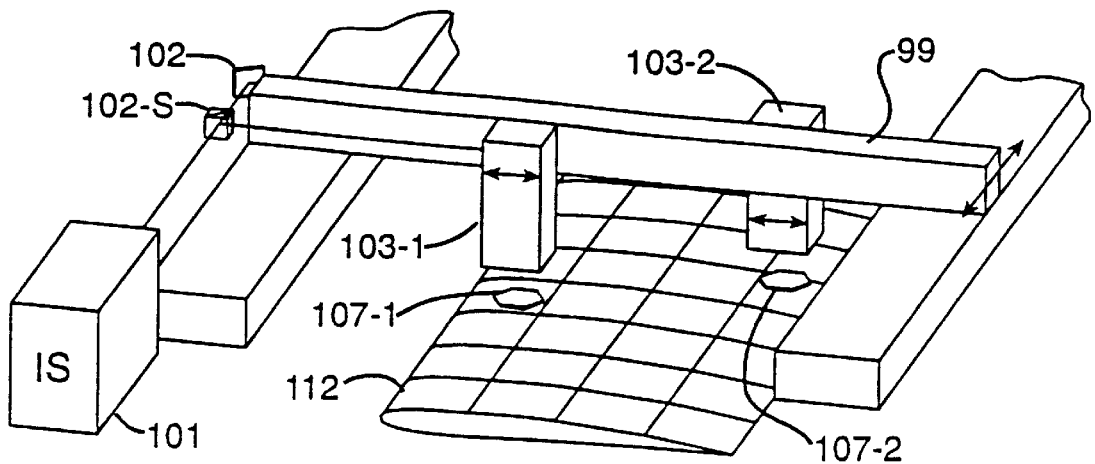
FIG. 11 shows a technique for providing a dosage of cure-initiating radiation, which may be non-equalized or equalized, on two surface areas of a single part, simultaneously.

FIG. 11 shows a technique for providing dosages of curing radiation on two different areas simultaneously. The two areas may be opposed top and bottom surfaces of the same complex-geometry composite part 112, or may be two separate treatment areas of the same surface of complex-geometry composite part 112, as shown, but the possibilities for variations are many, including more than two beams. Illumination subsystem 101 provides the UV-radiation beam, through beam-splitter turning mirror 102-S and turning mirror 102 to both beam processing subsystem 103-1 and beam processing subsystem 103-2. The plural beam processing subsystems 103-1 and 103-2 direct their controlled radiation patterns 107-1 and 107-2, respectively, to the appropriate surface areas of complex-geometry composite part 112. This type of multiple system offers a number of additional features. The multiple different beam processing modules 103-1, 103-2, . . . 103-n can deliver different amounts of energies over identically-sized or different-sized radiation beams. This can be used for those applications where it is desirable to selectively cure certain segments of the complex-geometry composite part 112 with a higher dose than for the rest of the part. For example, if there is a seam in an airfoil, the seam may require much higher dose to cure than the rest of the airfoil. There are also applications in which it is desirable to join different parts having different composition or different mass. The joints may require additional doses of UV-curing radiation, greater than is needed for other areas.

Figure 12:
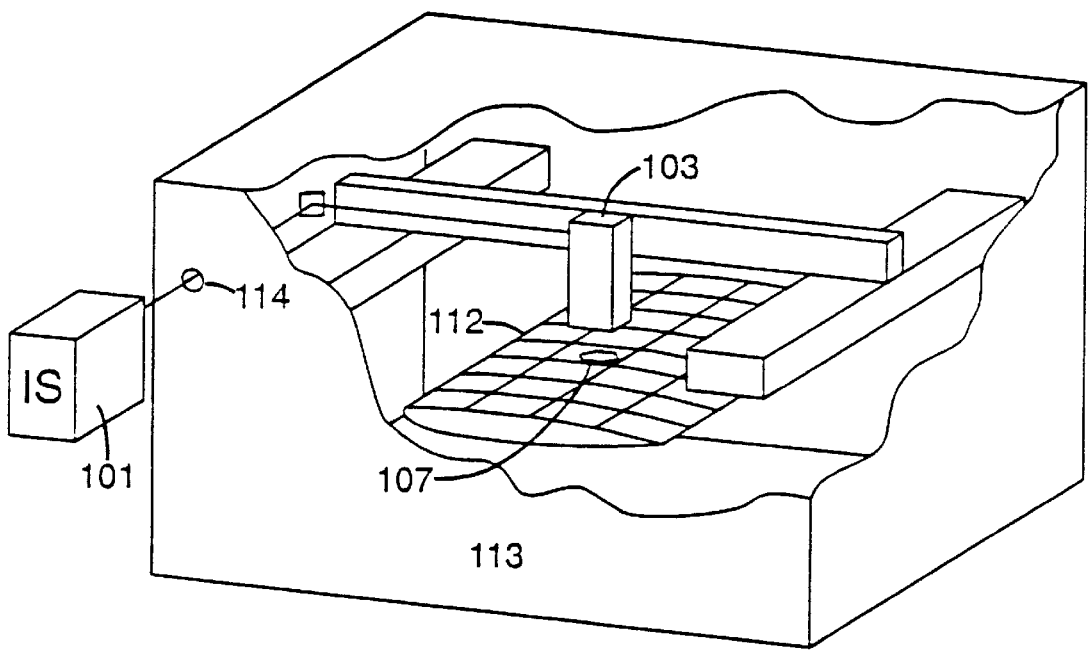
FIG. 12 shows a technique for combining the advantages of a thermal curing oven with the advantages of high-resolution ultraviolet cure initiation.

FIG. 12 shows a UV-based curing system which has been integrated with a conventional thermal curing system such as a convection oven. There are applications where it is desirable to selectively and partially cure certain segments of a part using a UV-based process, then complete the curing process using the conventional approach. There may also be applications where it is desirable to do the partial curing by using the conventional approach and the final curing using the UV-based system. In FIG. 12 the X-Y stage, the beam processing module 103, and the beam steering systems are all enclosed within the conventional oven 113, while the illumination source 10 remains outside the enclosure of the oven where it can be more effectively operated. FIG. 12 shows how UV-curing may be used for stabilizing a complex-geometry composite part 112 inside a convection oven 113 which then is useful for completing the cure. Illumination subsystem 101 provides a beam of UV-radiation, via transparent beam port 114 and directional optics to beam processing subsystem 103, which directs the controlled radiation pattern as polygonal illumination region 107 onto complex-geometry composite part 112.

Figure 13:
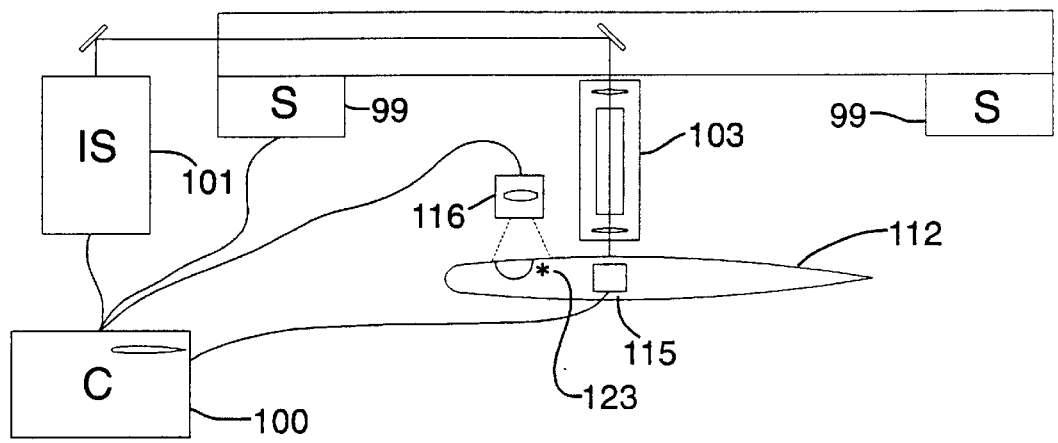
FIG. 13 shows apparatus and technique for control of nearly seamless, appropriately non-uniform, illumination can be developed from a virtual part stored in memory, developed by scanning a marked sample part or model, developed by control feedback from markings on the actual part, developed by control feedback from dynamic sensing of thermal characteristics of the actual part during the cure-initiating illumination scan, and by various combinations, using balanced ultraviolet cure initiation for establishing a temporary attachment of a part, or thermal curing of the part.

FIG. 13 shows how the UV-based curing system can be integrated with a sophisticated control system which can be used to accurately deliver the required dose according to CAD data which matches the necessary illumination parameters to the topography or internal structure of the part being cured. The scanning speed of the stage, the laser energy, the repetition rate of the laser, or some other parameter affecting the delivered dose, can be selected and combined to change, in real time, on-the-fly, as the part is being scanned. The dose, which may be deliberately non-uniform, can be varied to optimally cure the part. Control module 100 may have all necessary dosage and placement information pre-stored, to control stage 99, illumination subsystem 101, and beam processing module 103 according to such dosage and placement information. Alternatively, control module 100 may receive feedback signals from embedded thermal sensor 115 or from non-contact sensor 116, which is sensitive to a parameter such as color or temperature to provide condition-of-cure signals which control module 100 uses to update condition-of-cure information from which dosage and placement information can be recalculated. It is also possible to use non-contact sensors as simple as photocells to sense markings 123 applied to the surface of a composite part (110, 112). The externally-applied markings 123 describe the distribution and other parameters of desired photo-cure to be applied to the composite part (110, 112).

Figure 14:
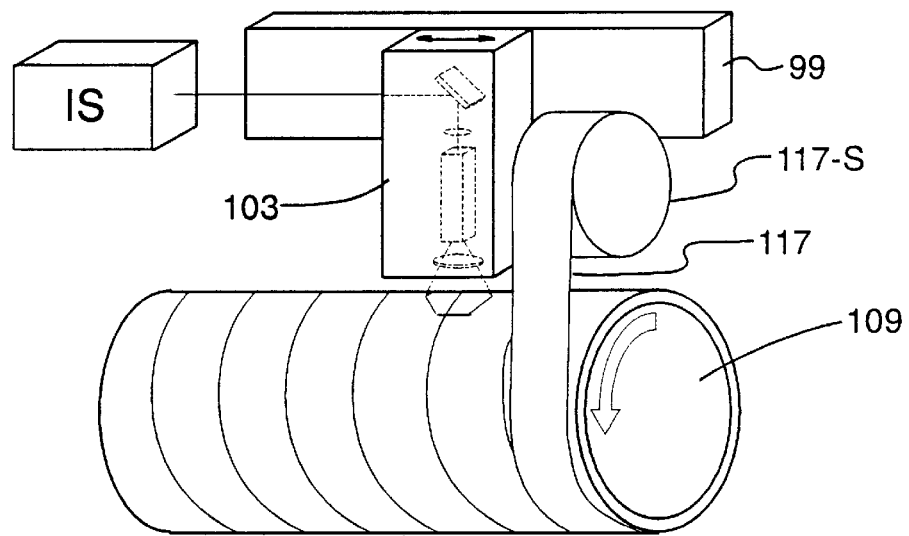
FIG. 14 shows how control of nearly seamless, appropriately non-uniform, illumination can develop a configured part by incrementally laying up the part to form a clone of a virtual part stored in memory.

FIG. 14 shows how ultraviolet photo-setting can be applied locally to the small field where composite fiber/resin web, such as tape 117, is currently being laid up on a previous layer of resin/fiber composite, with the result that the partially-formed complex-geometry composite part 112 is sufficiently stabilized to permit the laying up of additional material without distortion or mess. The application of the ultraviolet radiation can be integrated with this automated shape formation. Tape 117 is supplied by supply reel 117-S which is most conveniently mounted on beam processing module 103, to assure proper placement of both the tape and the related stabilizing radiation field.

All of the systems described above can operate at any of a number of ultraviolet wavelengths. This flexibility can be exploited to allow different types of thermoset resins with different spectral sensitivities to be utilized in the curing of a single part. The fact that different resins may cure at different rates when exposed to the same wavelength can be used to better control the overall curing process. It is also possible to use different wavelengths when exposing a single type of resin to achieve the same effect.

BENEFITS OF THE SYSTEM

UV-scanning system for curing of composite structures. Here we summarize the major context of curing very large structures:

(i) Seamless scanning uniformly delivers the required dose over any size structure.

(ii) This system controls the depth of cure for parts of varying thickness by tailoring the optical dose delivered to the structure according to its geometry.

(iii) This technology does not contact the part, so there is no concern for contaminating the material or for inducing any mechanical stress.

(iv) There is no required heating of large thermal masses, so the processing throughput is extremely high, limited only by the power of the laser source and the speed of the scanning stage.

(v) This technology lends itself very nicely to prototyping of new structures since there is no reliance on molds or on other customized parts.

(vi) The same system can be utilized to cure both very large and very small parts, which would not be at all practical for oven-based curing systems.

(vii) For rotationally symmetric structures, the exposure speed is increased further by a continuous helical scan. The throughput is also enhanced because the scanning velocity can be significantly larger than what can be accomplished with linear translation stages for large payloads.

(viii) This system does not suffer from any of the problems that plague autoclave systems, namely: improper rates of heating; blown vacuum bags; or loss of pressure.

(ix) With its unique hexagonal illumination configuration and maximum field utilization, the system delivers high throughputs using small-size optics modules, thus keeping system costs low. The hexagonal configuration also provides significantly enhanced throughput over other curing techniques.

(x) The high-throughput, large-volume capability can be delivered with off-the-shelf optical and mechanical components, thereby eliminating the need for development of complex and expensive machines, and reducing commercialization risks. This also helps reduce system costs.

(xi) The UV-based curing technology is compatible with existing conventional curing approaches so systems can be designed which can incorporate the new UV technology with the conventional curing approaches.

(xii) The curing process can be dynamically controlled by using CAD data stored in the control system, or employing feedback information from sensors embedded within the part or optically derived from the part.

(xiii) These techniques help enable the user to control the resin-to-fiber ratio and the uniformity of that ratio over the entire part, by directly stabilizing the resin in place. This control directly affects the final properties of the cured part.

The above advantages demonstrate that the seamless scanning technology in a UV-based curing system results in an extremely versatile processing tool that can manufacture very large composite structures cost-effectively and at a high throughput.

We claim:

1. A system for curing a plastic three-dimensional solid composite part (110, 112) characterized by:

a) an illumination source module (101) which produces a high-powered radiation beam;

b) a beam processing module (103) arranged to accept the beam output of said illumination source module (101) and deliver as its output a set of one or more sub-beams, each sub-beam of said set having a pre-determined numerical aperture, having a homogenizer (105) arranged to accept said beam output and forward a shaped, uniformized beam, having condenser means (106) arranged to accept the shaped, uniformized sub-beam output of said homogenizer (105) and to reconfigure the sub-beam output into a set of at least one operational sub-beam of predetermined characteristics;

c) a translation stage subsystem (99) for presenting a pattern of photo-curing radiation to different segments of said composite part (110, 112) for photocuring, and d) control means (100) to control said translation stage subsystem to control said beam processing module, to provide a pattern selectively to each one of a plurality of individual segments of said composite part (110, 112).

2. A system for curing a photo-curable composite part (110, 112), having a subsystem (99) for presenting different segments of said composite part (110, 112) for photocuring, characterized by:

a) an illumination source module (101) which produces a high-powered radiation beam;

b) a beam processing module (103) arranged to accept the beam output of said illumination source module (101) and deliver as its output a set of one or more sub-beams, each sub-beam of said set having a pre-determined numerical aperture, having a homogenizer (105) arranged to accept said beam output and forward a shaped, uniformized beam, having condenser means (106) arranged to accept the shaped, uniformized sub-beam output of said homogenizer (105) and to reconfigure the sub-beam output into a set of at least one operational sub-beam of predetermined characteristics;

c) a translation stage subsystem (99) for presenting a pattern of photocuring radiation to different segments of said composite part (110, 112) for photocuring;

d) control means (100) to control said translation stage subsystem to control said beam processing module, to provide a pattern selectively to each one of a plurality of individual segments of said composite part (110, 112); and e) means (113) for completing a photo-setting reaction of said composite part (110, 112).

3. A system according to claim 2, wherein said convection means (113) encompasses said beam processing module (103) and said composite part (110, 112), establishing an arrangement in which said convection means (113) provides a safety enclosure for said beam processing module (103) and said composite part (110, 112).

4. A system according to claim 2, wherein said convection means (113) encompasses said composite part (110, 112), establishing a safety enclosure for the output of said beam processing module (103) and said composite part (110, 112), and serves to partially cure said composite part (110, 112) so that final curing can be performed by said set of radiation sub-beams.

5. A system according to claim 2, wherein said convection means (113) encompasses said composite part (110, 112), establishing a safety enclosure for the output of said beam processing module (103) and said composite part (110, 112), allowing partial curing of said composite part (110, 112) by said set of radiation sub-beams, followed by final curing by said convection means (113).

6. A system according to claim 5, wherein said set of radiation sub-beams accomplishes selective curing of said composite part (110, 112) as a temporary stabilization measure.

7. A system according to claim 5, wherein said set of radiation sub-beams accomplishes selective curing of said composite part (110, 112) by providing incremental curing of areas requiring increased cure.

8. A system according to claim 2, wherein said control means (100) provides for variable UV doses at varying areas of said composite part (110, 112).

9. A system according to claim 2, wherein said control means (100) provides selective UV doses at varying areas of said composite part (110, 112), with optimal seamlessness as a result of overlapping polygonal scans.

10. A system according to claim 2, wherein said control means (100) provides for variable object field size to vary the UV dose at varying areas of said composite part (110, 112).

11. A system according to claim 2, wherein said control means (100) provides for variable repetition rate, variable pulse energy, or variable wavelength of the illumination source to vary the UV dose at varying areas of said composite part (110, 112).

12. A system according to claim 2, wherein said control means (100) provides for variable scanning speed of translation stage subsystem (99) to vary the UV dose at varying areas of said composite part (110, 112).

13. A system according to claim 2, wherein said control means (100) causes said beam processing module (103) to provide complementary overlapping polygonal scans of said composite part (110, 112).

14. A system according to claim 2, wherein said beam processing module (103) is equipped to split the beam output into plural sub-beams wherein each beam illuminates said composite part (110, 112) and wherein said control means (100) is arranged to provide appropriate dosages which are equalized.

15. A system according to claim 2, wherein said beam processing module (103) is equipped to split the beam output into plural sub-beams wherein each beam illuminates said composite part (110, 112) and wherein said control means (100) is arranged to provide appropriate dosages which are not equalized.

16. A system according to claim 2, wherein said beam-processing module (103) includes said homogenizer (105) and said condenser means (106), integrated with web supply means (117-S) to provide a set of operational sub-beams controlled for scanning a region of said composite part (110, 112) as it is being laid up by incrementation of web (117), to perform partial or complete curing for stabilization during lay-up of said composite part (110, 112).

17. A method of initiating photo-curing reactions in a composite part (110, 112), characterized by the following steps:

(step 1) Allocating an illumination source module (101) having sufficient power to irradiate said composite part over a polygonal area;

(step 2) Arranging a beam processing module (103) to accept the beam output of said illumination source module (101) and forward a set of one or more subbeams, each with the selected numerical aperture;

(step 3) Arranging a homogenizer (105) to accept the sub-beam output of said beam processing module (103) and forward a set of shaped, uniformized sub-beams;

(step 4) Arranging condenser means (106) to accept the sub-beam output of said homogenizer (105) and to reconfigure the sub-beam output into a set of one or more sub-beams of predetermined characteristics, which expose an increment of said composite part (110, 112) to initiate selective photo-curing; and (step 5) Activating said illumination source module to initiate photo-curing reactions.

18. A method of initiating photo-curing reactions in a composite part according to claim 17, said composite part having an optimum dose profile, wherein the UV dose delivered by said set of sub-beams is computer-controlled to achieve a customized dose profile optimized for said composite part (110, 112).

19. A method of initiating photo-curing reactions in a composite part according to claim 17, said composite part having an optimum dose profile which may differ from location to location within said composite part, wherein the UV dose delivered by said set of sub-beams is computer-controlled in response to feedback from feedback sensors (115, 116) responding to the dynamic condition of said composite part (110, 112) to achieve a customized dose profile optimized for said composite part (110, 112).

20. A method of initiating photo-curing reactions in a part according to claim 19, wherein said feedback sensors (115, 116) respond to changes of measurable physical phenomena related to condition of cure.

21. A method of initiating photo-curing reactions in a composite part (110, 112) according to claim 17, wherein the UV dose delivered by said set of sub-beams is computer-controlled by varying the illumination source repetition rate or pulse energy to achieve a customized dose profile optimized for said composite part (110, 112).

22. A method of initiating photo-curing reactions in a composite part according to claim 17, wherein the UV dose delivered by said set of sub-beams is computer-controlled by varying the scanning speed of said translation stage (99) to achieve a customized dose profile optimized for said composite part (110, 112).

23. A method of initiating photo-curing reactions in a composite part according to claim 17, wherein the UV dose delivered by said set of sub-beams is computer-controlled by varying the object field size to achieve a customized dose profile optimized for said composite part (110, 112).

24. A method of controlling the initiation of photo-curing reactions in a composite part (110, 112) according to claim 17, wherein the UV dose delivered by said set of sub-beams is determined through a simultaneous scan of said composite part (110, 112) for feedback generated from a set of sensors (115) included within said composite part (110, 112), each indicative of the instantaneous condition of photo-curable resins at the related position of said composite part (110, 112).

25. A method of controlling the initiation of photo-curing reactions in a composite part (110, 112) according to claim 17, wherein the UV dose delivered by said set of sub-beams is determined through a simultaneous scan of said composite part (110, 112) and feedback generated from a sensor (115, 116) sensitive to a parameter of photo-curable resin at a position on said composite part (110, 112).

26. A method of controlling the initiation of photo-curing reactions in a composite part (110, 112) according to claim 17, wherein the UV dose delivered by said set of sub-beams is determined by a computer model of the photo-curing dosage requirements across said composite part (110, 112).

27. A method of controlling the initiation of photo-curing reactions in a composite part (110, 112) according to claim 26, characterized by said composite part (110, 112) having externally-applied markings (123) describing the distribution of photo-curable resin across said composite part (110, 112).

28. A method of initiating photo-curing reactions in a three-dimensional composite part built up in incremental layers by selective illumination characterized by step 1 providing a set of first, second . . . nth specific photo-initiators having different sensitivities to first, second . . . nth specific wavelengths of ultraviolet radiation, step 2 exposing said first photo-initiator with said first wavelength ultraviolet radiation at selected positions at specific times during the process;

step 3 exposing said second photo-initiator with said second wavelength ultraviolet-radiation at selected positions at specific times during the process; and step n exposing said nth photo-initiator with said nth wavelength ultraviolet-radiation at selected positions at specific times during the process, whereby said three-dimensional composite part is built up in incremental layers by selective illumination.

29. A composite part (110, 112), with a non-uniform distribution of photo-curable resins at varying positions in its body, made by the process of claim 17 with a varying UV dose consistent with varying resin distribution in said composite part (110, 112).

30. A composite part (110, 112) with a non-uniform distribution of photo-curable resins at varying positions in its body, made by the process of claim 26 with a varying UV dose consistent with varying resin distribution, wherein said composite part (110, 112) with cure variations determined by a computer model of radiation requirements for curing each increment of said composite part (110, 112).

31. A composite part (110, 112) with a non-uniform distribution of photo-curable resins at varying positions in its body, made by the process of claim 27 with a varying UV dose consistent with varying resin distribution, wherein said composite part (110, 112) has cure variations determined by external markings on the surface of said composite part (110, 112).

32. A composite part (110, 112) with a non-uniform distribution of photo-curable resins at varying positions in its body, made by the process of claim 25 with a varying UV dose consistent with varying resin distribution, wherein said composite part (110, 112) the UV dose delivered by said set of sub-beams is determined through a simultaneous scan of said composite part (110, 112) and feedback generated from a sensor (115, 116) sensitive to a parameter of photo-curable resin at a position on said composite part (110–112).

33. A composite part (110, 112) with a non-uniform distribution of photo-curable resins at varying positions in its body, made by the process of claim 17 with a varying UV dose consistent with varying resin distribution, wherein the UV dose delivered by each beam of said set of sub-beams may differ.

* * * * *